Dec. 13, 1960  G. I. BUTLER  2,964,273
ORNAMENTAL TREE SUPPORT
Filed May 26, 1959

GEORGE I. BUTLER
INVENTOR
HUEBNER & WORREL
ATTORNEYS

United States Patent Office 2,964,273
Patented Dec. 13, 1960

2,964,273

ORNAMENTAL TREE SUPPORT

George I. Butler, 1212 E. Cornell, Fresno, Calif.

Filed May 26, 1959, Ser. No. 815,857

1 Claim. (Cl. 248—48)

The present invention relates to a tree support and more particularly to a stand for Christmas trees which is quickly and easily installed and removed and which provides dependable tree support during use.

Christmas trees have characteristically been somewhat difficult and tedious to erect in precise vertical positions because of their widespread branches and location of such branches in proximity to the base of the trunk. Accordingly, a wide variety of stands have been developed for supporting such trees in upright position on a floor, or other support surface.

With some tree stands of the prior art, it has usually been necessary to lay the tree on its side to enable nailing or screwing brackets or boards to the base of the trunk. This frequently causes damage to the trees by breaking their limbs, shaking needles from the trees, and is usually somewhat inconvenient to accomplish in the home. Further, those stands which provide upwardly disposed receptacles for the tree trunk are usually not adjustable to enable precise vertical positioning of the trunk. These, and other stands, require vertical movement of the tree to set or adjust it in the stand. Especially with tall trees closely adjacent to or contacting the ceiling, this is undesirable. With stands which provide no inherent adjustment means, it is sometimes necessary to detach and attach the stand to the tree several times by way of trial and error attempts before the tree is supported in the desired erect position. Other stands are dependable but require such secure attachment as to be detached only with great difficulty. Further, many known stands preclude the use of a reservoir in which to stand the trunk of the tree when it is desired to provide water for the trunk.

Accordingly, it is an object of the present invention to provide an improved support for a detached ornamental tree.

Another object is to provide a stand for releasable attachment to a tree.

Another object is to facilitate connection and removal of a stand to and from a tree.

Another object is to provide a stand for a tree which is adapted for connection to the tree without impaling, cutting into, or causing other detrimental effect to the tree.

Another object is to provide a stand for a tree which enables quick adjustment of the tree in the stand to a desired attitude.

Another object is to provide a Christmas tree stand adapted for connection to the tree when in an upstanding position and with a minimum amount of vertical movement of the tree.

Another object is to provide a tree stand which is economical, simple to construct and use, and adapted for repeated use.

These, together with other objects, will become more fully apparent upon reference to the following description and accompanying drawing.

Figure 1:
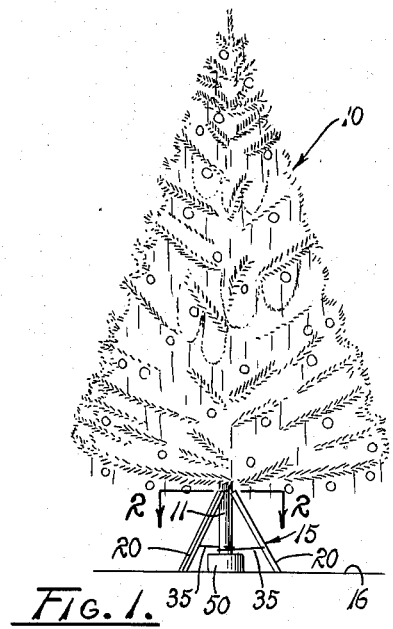
Fig. 1 is a side elevation of a Christmas tree supported by a stand incorporating the principles of the present invention.
Figure 2:
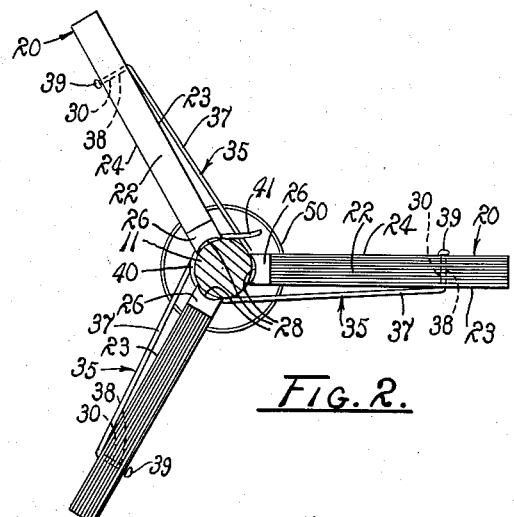
Fig. 2 is a somewhat enlarged horizontal transverse section taken on line 2—2 of Fig. 1.
Figure 3:
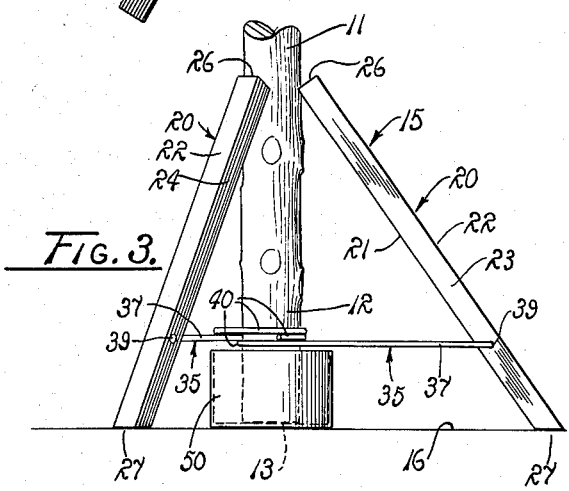
Fig. 3 is a somewhat enlarged fragmentary side elevation of a lower portion of the tree trunk of Fig. 2 also showing the subject invention.
Figure 5:
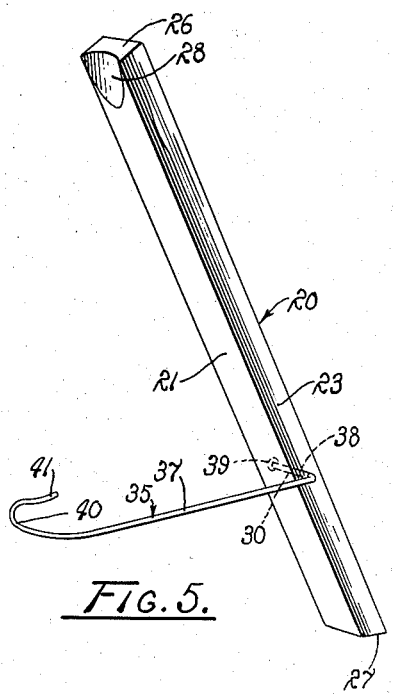
Fig. 5 is a perspective view of one of the units of the stand of the present invention in the position the link and leg thereof assume in tree supporting relation.
Figure 4:
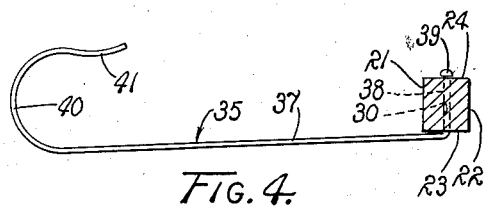
Fig. 4 is a still further enlarged horizontal section taken through a leg of one unit of the subject stand and also showing a link of such unit connected to the leg.

Referring more particularly to the drawing, the subject invention is conveniently described in association with an ornamental detached or cut tree 10, such as a Christmas tree, which has been detached from its stump in the ground, and which is adapted for decorative purposes in the home during the Christmas season. The tree provides a substantially cylindrical trunk 11 substantially concentric to a longitudinal axis and having a lower end 12 terminating in a radial end face 13. A stand, generally indicated by the numeral 15, and embodying the principles of the present invention is illustrated in Fig. 1 and is adapted for supporting the tree in a substantially erect position upwardly from a support surface 16, which usually is a floor or the ground.

The stand 15 includes a plurality of elongated, rigid legs 20 of rectangular cross section having inner surfaces 21, outer surfaces 22 and side surfaces 23 and 24. The legs are preferably made of wood, such as birch wood, and in an embodiment which has been found to work quite satisfactorily, have been approximately one inch by one and one-fourth inches in transverse dimensions and approximately eighteen inches in length. The specific material and dimensions of the legs noted is not intended to limit the invention but merely suggests a construction which has been found to be desirable.

The legs 20 also provide upper end surfaces 26 and lower end surfaces 27. The legs have concave pockets 28 therein, which pockets are formed in the upper ends of the legs by routing out portions of the upper end and inner surfaces 21. These pockets have curvatures adapted complementarily to fit the outer cylindrical surface of the trunk 11 of the tree 10 to be supported. Additionally, the lower end surfaces of the legs are preferably beveled so as to be in oblique angularity with reference to the inner and outer surfaces of their respective legs. Specifically the lower end surface of each leg is acutely angularly related to its outer surface 22.

The support stand 15 also includes a plurality of tension links 35 preferably constructed from wire of the type employed for wire coat hangers. Accordingly, the links have relatively high tensile strength, and an adequate balance of transverse rigidity and resilient flexibility to serve the purposes of the present invention. Again, it is to be emphasized that the material specified for thel inks is not intended to limit the invention. Each of the links includes an elongated substantially straight shank 37, an outer journal end portion 38 extended in substantially right-angular relation to the shank and terminating in a somewhat enlarged head 39. Each link also has an inner arcuate hooked end portion 40 reversely curved in substantially the same plane as the shank and the journal end portion and terminating in a tip 41 laterally spaced from its respective shank by an amount substantially equal to the diameter of the trunk 11 of the tree 10 to be supported.

The legs 20 and tension links 35 described are respectively identical and may be provided in any number desired as long as the total number is not less than three when used for supporting a tree in the manner illustrated. The outer journal end portions 38 of the links are respectively individually rotatably fitted in the sockets 30 of the legs 20 with the head 39 against the opposite side surface 23 of each leg from the side surface 25 against which the shank is positioned. Each link is therefore connected to its respective leg for pivotal movement about an axis defined by its respective journal portion all for a purpose to be described subsequently.

Operation

The operation of the disclosed embodiment of the subject invention is believed to be apparent and is briefly summarized at this point.

In the use of the subject stand 15 for supporting a Christmas tree 10, the tree is preferably held manually in generally upright position with the lower end 12 of the trunk 11 preferably extended into a receptacle 50 containing water. The inner hooked end portions 49 of the tension links 35 are then extended around the tree trunk above the receptacle, so that said hooked end portions are in generally vertically stacked relation, and so that they circumscribe an opening through which the trunk is extended and which is substantially concentric to the longitudinal vertical axis of the trunk. As such, the shanks 37 extend substantially tangentially outwardly from the tree trunk in substantially equally circumferentially spaced relation to each other.

The lower end surfaces 27 of the legs 20 are placed flush against the support surface 16 around the receptacle 50 and the upper ends of the legs are pivoted about their respective journal end portions 38 inwardly into engagement with the tree trunk. When three units, each consisting of a link 35 and a leg 20, are employed, the angular relation between the legs will, of course, be approximately one-hundred and twenty degrees. Thus assembled, the pockets 28 are substantially concentric to the vertical axis of the tree trunk and receive the trunk in nested engagement therewithin. The upper ends of the legs are manually pressed inwardly against the trunk and thus slide downwardly along the trunk to place the shanks 27 of the links 35 under tension between the trunk and the legs, as will be evident. The tree can be slid upwardly or downwardly relative to the upper ends of the legs 20 and the hooked end portions 40 so that the lower end face 13 rests firmly on the bottom of the receptacle 50. The receptacle 50 is entirely optional. It is advantageous to employ when it is desired to stand the tree in a reservoir of water. Obviously the support functions the same whether or not the receptacle is utilized.

From the foregoing it will be evident that an exceedingly simple stand has been provided for supporting ornamental trees which have been detached from their growing positions and which are adapted for decorative purposes in homes, and the like. Notwithstanding its simplicity, the stand is amazingly effective for ornamental tree support. The hooked end portions 40 are easily connected to the tree trunk and disconnected therefrom and yet when the legs 20 and associated links 35 are connected in assembled relation to the tree, the latter is supported dependably in desired erect position. The stand does not rely on nails, screws or prongs for connection to the tree, nor does it cut or otherwise damage the tree. As explained the tree may be easily adjusted within the legs and hooked end portions into a predetermined vertical position. Further, the individual units comprising the stand are readily closed and can be stored in compact condition.

It will, of course, be apparent that the support is also suited to the sustaining of many other objects in upright position, such as flag standards, sign posts and the like.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claim so as to embrace any and all equivalent devices and apparatus.

Having described my invention, what I claim as new and desire to secure by Letters Patent is:

A stand for supporting an ornamental cut tree having a trunk in a substantially upright position from a support surface comprising more than two substantially identical elongated legs disposable in substantially equally spaced relation about the trunk of such a tree and each having a lower end adapted slidably to rest on such a support surface in outwardly radially spaced relation to the trunk of the tree to be supported, being upwardly convergently extended with respect to a reference axis substantially coaxial with the trunk, and having an upper end providing a concavity longitudinally slidably engageable with the trunk in upwardly spaced relation to such support surface; and an elongated tension member of wire individual to each leg and each such member having an outer end in substantially right angular relation to its length extended into its respective leg intermediate said leg's upper and lower ends in substantially right angular relation to its said leg for elevational pivotal movement about its said outer end as an axis, the outer ends of the tension members being substantially tangential to a common circle concentric to said reference axis, and each tension member having an inner arcuate reversely turned end adapted to hook around the tree trunk intermediate the support surface and the upper end of the leg whereby each such tension member is placed under tension incident to sliding the upper end of its associated leg downwardly against the trunk and the lower end of its leg outwardly from the trunk.

References Cited in the file of this patent

UNITED STATES PATENTS

| 397,305 | Osborne | Feb. 5, 1889 |
| 710,762 | Cook | Oct. 7, 1902 |
| 2,908,461 | Coffeen | Oct. 13, 1959 |

FOREIGN PATENTS

| 38,439 | France | Mar. 3, 1931 |
| | (1st addition to No. 677,590) | |